(12) United States Patent
Kruedener et al.

(10) Patent No.: US 11,519,208 B2
(45) Date of Patent: Dec. 6, 2022

(54) CONNECTOR AND FURNITURE PART

(71) Applicant: Grass GmbH, Reinheim (DE)

(72) Inventors: Boris Kruedener, Kleinostheim (DE); Sebastian Lautenschlaeger, Seeheim-Jugenheim (DE)

(73) Assignee: Grass GmbH, Reinheim (DE)

( * ) Notice: Subject to any disclaimer, the term of this patent is extended or adjusted under 35 U.S.C. 154(b) by 892 days.

(21) Appl. No.: 16/385,342

(22) Filed: Apr. 16, 2019

(65) Prior Publication Data
US 2019/0316396 A1 Oct. 17, 2019

(30) Foreign Application Priority Data

Apr. 17, 2018 (DE) ...................... 20 2018 102 085.4

(51) Int. Cl.
*E05D 5/00* (2006.01)
*E05D 5/02* (2006.01)
(Continued)

(52) U.S. Cl.
CPC ............ *E05D 5/0215* (2013.01); *E05D 1/00* (2013.01); *E05D 11/0054* (2013.01); *E06B 5/006* (2013.01); *E05Y 2900/20* (2013.01)

(58) Field of Classification Search
CPC ..... E05F 1/1276; E05F 1/1246; E05F 1/1253; E05F 1/1261; E05F 1/1058; E05F 1/1075; E05F 1/14; E05F 3/20; E05D 3/06; E05D 3/12; E05D 3/16; E05D 3/18; E05D 1/00; E05D 1/06; E05D 5/0215; E05D 5/023; E05D 5/0238; E05D 5/0276; E05D 11/0054; E05D 11/00; E05D 11/11; E05Y 2201/21; E05Y 2201/264; E05Y 2201/47;
(Continued)

(56) References Cited

U.S. PATENT DOCUMENTS 3,016,642 A * 1/1962 Kowalski ............... A47G 1/102
40/784
3,709,533 A * 1/1973 Walters ............... E05D 15/0647
160/381
(Continued)

FOREIGN PATENT DOCUMENTS

CH 698 592 B1 9/2009
CH 705 813 A2 5/2013
(Continued)

OTHER PUBLICATIONS

German Search Report (Application No. 20 2018 102 085.4) dated Aug. 1, 2018.
(Continued)

*Primary Examiner* — Chuck Y Mah
(74) *Attorney, Agent, or Firm* — Burr & Brown, PLLC (57) ABSTRACT

A connector by way of which two frame elements of a frame of a furniture part can be connected, wherein the connector includes a corner-connecting mechanism for connecting respective end portions of the two frame elements in a corner region of the furniture-part frame. An attachment portion for attachment to a pivoting device is integrated on the corner-connecting mechanism, wherein the furniture part can be accommodated on a basic structure of a piece of furniture such that it can be pivoted by means of the pivoting device.

13 Claims, 4 Drawing Sheets

(51) Int. Cl.
*E05D 1/00* (2006.01)
*E05D 11/00* (2006.01)
*E06B 5/00* (2006.01)

(58) Field of Classification Search
CPC ......... E05Y 2201/492; E05Y 2201/618; E05Y 2900/20; E05Y 2900/202; A47B 2220/0072; Y10T 16/5383; Y10T 16/547; Y10T 16/5476; Y10T 16/5357; Y10T 16/5358; Y10T 16/5363; Y10T 16/5367; E06B 5/006; A47G 1/10; A47G 1/101; A47G 1/102
See application file for complete search history.

(56) References Cited

U.S. PATENT DOCUMENTS

| | | | |
|---|---|---|---|
| 4,124,322 A * | 11/1978 | Parisien | E06B 3/9648 160/381 |
| 5,343,594 A * | 9/1994 | Harvey | E05D 15/066 16/105 |
| 6,266,848 B1 | 7/2001 | Fraccaro et al. | |
| 2001/0014250 A1 | 8/2001 | Plummer et al. | |
| 2008/0042531 A1 | 2/2008 | Livingston et al. | |
| 2009/0003928 A1 * | 1/2009 | Ohrstrom | E05D 15/0647 403/205 |

FOREIGN PATENT DOCUMENTS

| | | | | |
|---|---|---|---|---|
| CN | 202544593 U | * | 11/2012 | |
| DE | 7238739 U | | 11/1973 | |
| DE | 29623105 U1 | * | 10/1997 | ......... E05D 15/5214 |
| DE | 19811375 A1 | * | 9/1998 | ......... E05D 15/5202 |
| DE | 20 2007 011 928 U1 | | 1/2008 | |
| DE | 102010027957 B4 | * | 8/2015 | ......... E05D 15/5214 |
| EP | 0 769 259 A1 | | 4/1997 | |
| EP | 2949849 A1 | * | 12/2015 | ......... E05D 15/5211 |
| JP | 2002317582 A | * | 10/2002 | |
| WO | WO-2016061639 A1 | * | 4/2016 | ............ E06B 3/968 |
| WO | WO-2017035608 A1 | * | 3/2017 | ............ E06B 3/9682 |

OTHER PUBLICATIONS

Extended European Search Report (Application No. 19168556.9) dated Oct. 2, 2019.

* cited by examiner

CONNECTOR AND FURNITURE PART

This application claims the benefit under 35 USC § 119(a)-(d) of German Application No. 20 2018 102 085.4 filed Apr. 17, 2018, the entirety of which is incorporated herein by reference.

FIELD OF THE INVENTION

The present invention relates to a connector and furniture part.

BACKGROUND OF THE INVENTION

Connectors by way of which two frame elements of a frame of a frame-type furniture part can be connected are known. The connectors comprise, for example, a corner-connecting mechanism for connecting respective end portions of the two frame elements, which meet in a corner region of the frame.

The connectors are used, for example, for furniture parts which have a profile frame made up of a plurality of frame profiles, wherein the frame profiles are connected to one another by the connectors.

In a finished profile frame, the corner-connecting mechanisms are accommodated in a state in which they are recessed, in particular, at least to some extent, in the frame elements.

The furniture-part frame made up of, for example, hollow metal profiles surround an inner region of the furniture part for example made of glass or some other material.

The furniture part is, for example, a door or flap, for example, an aluminum-frame door or an aluminum-frame flap, such as a top-mounted flap of a cabinet. The top-mounted flap is fitted on a basic structure of the cabinet in a pivotable manner, for example, by means of an appropriate pivoting device, such as a top-mounted-flap fitting comprising one or two fitting units.

The device for moving the furniture part comprises a guide which has at least one pivoting arm for pivoting the furniture part and by way of which, when the device is installed, the furniture part can be moved out of a closed position into an open position of the furniture part relative to the basic furniture structure, and back.

SUMMARY OF THE INVENTION

The object of the present invention is to improve the attachment of a frame-construction furniture part to a device for moving the furniture part relative to a basic furniture structure. In particular, this should advantageously be possible on existing frame-construction furniture parts without any additional components being used.

The present invention proceeds from a connector by way of which two frame elements of a frame of a furniture part can be connected, wherein the connector comprises a corner-connecting mechanism for connecting respective end portions of the two frame elements in a corner region of the furniture-part frame. The furniture part is preferably of frame-type construction.

The core of the present invention is that an attachment portion for attachment to a pivoting device is integrated on the corner-connecting mechanism, wherein the furniture part can be accommodated on a basic structure of a piece of furniture such that it can be pivoted by means of the pivoting device.

In relation to existing corner-connecting mechanisms, it is possible for attachment to the pivoting device to be realized in a space-saving and effective manner on the already present corner-connecting mechanism of the furniture part, or this can be done with minimal additional outlay.

The attachment portion, on the other hand, is a pivoting-device component which has likewise always been required in any case and is necessary for fitting the pivoting device, or for example a top-mounted-flap fitting, on the pivotable furniture part. It is advantageously possible, for example, for the attachment portion to be already integrated on an existing corner-connecting mechanism or for it to be fastened thereon. It is advantageous, for mechanical and practical reasons, for the attachment portion to be linked to the corner connector. The corner region constitutes a peripheral region of the furniture part and is, therefore, suitable for non-disruptive operation of the pivoting device. Moreover, in the case of hollow profiles, the corner regions of the furniture-part frame each provide a region of increased mechanical stability because the corner connector provides additional stability in the corner region, in comparison with the rest of the regions of the furniture-part frame, in which there is no corner connector present and/or the interior of which has no element inserted in it, and is therefore hollow. The increased amount of stability in the corner region of the furniture-part frame in comparison with hollow regions is, therefore, advantageous for connection to the attachment portion and/or to the pivoting device.

The attachment portion is preferably integrated in a releasable manner on the corner-connecting mechanism or is part of the corner-connecting mechanism. The attachment portion is preferably configured in the form of an installation unit, wherein, in the case of known pivoting devices, the installation unit is provided for fitting on a surface-area side of the furniture part.

The pivoting device is designed, in particular, in the form of a top-mounted-flap fitting for wall units. The pivoting device comprises, in particular, a basic unit mounted on the basic furniture structure, a guide having a pivoting-arm arrangement, preferably with an energy store and/or a damping arrangement, and also a flap-mounted installation unit.

In the case of relatively large movable furniture flaps, the components of the movement device have to be of sufficiently stable configuration. For good ease of operation, the present invention provides, in particular, power assistance by way of the energy store for the opening movement and/or the damping arrangement for the damped closing movement of the furniture part. In the case of two fitting units between the basic furniture structure and the furniture part, the connector according to the present invention is active preferably on both fitting units.

The attachment portion is preferably fitted in a releasable manner on the corner-connecting mechanism. In particular, the attachment portion is fitted on a single-piece corner-connecting mechanism. This allows the attachment portion to be optionally established or left out in a flexible manner. A single-piece design, in which the corner-connecting mechanism is included or integral with the attachment portion, is not ruled out.

It is also advantageous if the corner-connecting mechanism comprises a main body, on which the attachment portion is accommodated. The main body preferably has a prepared portion, e.g. a screw-on opening for the preferably releasable fitting of the attachment portion. The main body is, in particular, configured to connect the two end portions of the two connectable frame elements.

One advantage of the present invention is evident when the attachment portion is fitted on a side of the main body which is directed toward an inner side of the frame of the furniture part, it being possible for the frame to be formed by the frame elements. The attachment portion is thus also provided on the relevant side of the main body of the corner-connecting mechanism. This side is advantageously directed toward the basic furniture structure and is, therefore, suitable to be connected to one end of the pivoting device. The pivoting device is configured to have its other end connected to the basic furniture structure.

It is also advantageous if the main body comprises a first elongate arm and a second elongate arm, wherein the first arm is oriented at an angle to the second arm. The attachment portion is preferably present on just precisely one of the two arms, in particular, preferably, not in the angular region which connects the two arms.

The main body is designed such that a respective arm can be connected to a respectively associated frame element. In the connected state of the two frame elements, the arms are each accommodated preferably in a fully recessed state in an interior of the frame element. Each arm is preferably provided with a fastener for fastening to the respectively associated frame element, e.g. a screw-connection opening or a plug-fit region. The two arms are preferably located at right angles to one another. One of the two arms has, for example, a portion which is recessed in relation to adjacent portions, wherein the attachment portion is fitted on the recessed portion or comprises the same. This is particularly space-saving.

According to an advantageous modification of the present invention, the corner-connecting mechanism is configured for accommodating in an inner volume of the connectable two frame elements of the furniture-part frame. This means that hollow frame elements or hollow end portions of the frame elements can advantageously be connected. It is preferably the case that in particular the respective arm can be plug-fitted in an interior or cavity of the frame elements or of the end portions thereof. This provides for uncomplicated assembly of the furniture-part frame from the individual frame elements.

It is preferably the case that the corner-connecting mechanism cannot be seen on an outer side of the furniture part.

An alternative advantageous configuration of the present invention is distinguished in that the attachment portion comprises two projecting contact portions on the corner-connecting mechanism. The projecting contact portions can be readily or advantageously connected, for example, latched in a releasable manner, to a mating portion, for example, to a latching portion of the pivoting device, in order to establish a latching connection. Two contact portions make it possible to establish a compact and, at the same time, comparatively stable connection or two-point connection.

According to a further advantageous aspect of the present invention, an adjuster for adjusting a height position and/or a lateral position of the attachment portion are present on the corner-connecting mechanism. The attachment portion is thus adjustable relative to the corner-connecting mechanism and it is therefore the case, when the piece of furniture is in the finished state, that the furniture part can be adjusted relative to the pivoting device and thus relative to the basic furniture structure. This allows precise or desired positioning of the furniture part on the piece of furniture, or relative to the basic furniture structure, which is advantageous from a visual point of view. The furniture part can thus be moved vertically and/or horizontally into the center in relation to a front side of the basic furniture structure. Adjustment of a depth position of the attachment portion on the corner-connecting mechanism is also possible as an alternative, or in addition.

A further advantage can be considered that of the adjuster comprising a screw-connection element, which can be screwed into the main body and engages through a guide portion, such as a slot, in the attachment portion. This can be established straightforwardly and provides for an easy-to-operate adjustment option, for example, using a screwdriver. An eccentric screw-connection element with a respective associated guide portion or slot is preferably provided in each case for the respective horizontal and vertical positioning or depth adjustment. The one screw-connection element here serves for lateral adjustment and the other screw-connection element serves for height adjustment. The screw-connection elements are present preferably such that the screw-connection elements, at the same time, provide the connection between the attachment portion and the main body.

Another advantage resides in the attachment portion being designed in the form of an elongate angular element with two limbs located at an angle to one another, wherein a first limb of the angular element has the two projecting contact portions, and the adjuster for adjusting the height position and/or lateral position of the attachment portion on the corner-connecting mechanism is active on a second limb of the angular element. This provides a particularly compact construction. For example, the contact portions are located in a line, or in alignment, and at a spacing apart from one another on the associated limb of the angular element. The second limb is preferably fastened on an inner side of the corner-connecting mechanism, as seen in relation to the furniture part.

The present invention also extends to a furniture part having a frame, which is formed from at least two frame elements and surrounds a surface-area region of the furniture part, wherein the frame elements are connected by a connector according to one of the configurations described above. This makes it possible to achieve the corresponding advantages on the furniture part, such as a pivotable furniture flap, having a frame and an inner element, for example having an aluminum frame with glass insert, accommodated therein.

The frame elements advantageously have hollow-profile portions, wherein the connection of the frame elements by the connector is established in the region of the hollow-profile portions. This allows the frame elements to be connected in a compact manner, without the connection being visible on the frame. The frame elements are preferably continuously hollow profiles which, in order to form the furniture-part frame, are cut to the desired length and, for the purpose of establishing the angular corner connection with an abutting mitre joint, have an end side located at an angle to the longitudinal axis. The corner-connecting mechanism is plug-fitted in the corner region, within the two frame elements.

BRIEF DESCRIPTION OF THE DRAWINGS

Further features and advantages of the present invention will be explained in more detail with reference to exemplary embodiments illustrated schematically in the figures, in which, specifically.

DETAILED DESCRIPTION OF THE INVENTION

In some cases the same reference signs will be used hereinbelow for corresponding elements of different exemplary embodiments.

Figure 1:
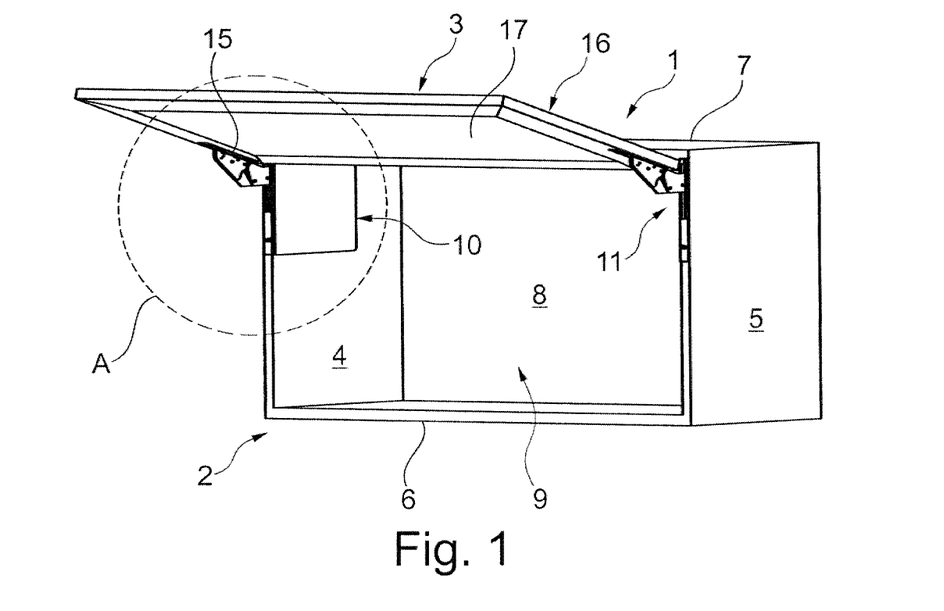
FIG. 1 shows a perspective view of a piece of furniture having a frame-type furniture part according to the present invention with a furniture-part frame.

FIG. 1 shows a perspective view of a piece of furniture or of a wall unit 1 in a use position, having a box-like basic furniture structure 2 and a furniture part according to the present invention, which is accommodated on a basic furniture structure and is designed in the form of a top-mounted flap 3, which is shown in an open position relative to the basic furniture structure 2. The furniture part or the top-mounted flap 3 has a furniture-part frame 16 made up of four frame elements, for example, made of aluminum, the frame elements preferably being of identical profile shape. The furniture-part frame 16 is of frame-type construction or the frame elements thereof are put together as a frame construction. In addition, the top-mounted flap 3 has an inner element 17, for example, a glass panel, accommodated on the furniture-part frame 16, wherein the inner element 17 is surrounded or enclosed by the furniture-part frame 16.

The basic furniture structure 2 comprises two upright side walls 4 and 5, which are located opposite one another and are connected, at the bottom, to an underside 6 and, at the top, to an upper side 7. On the rear side, the basic furniture structure 2 is closed by a rear wall 8.

A movement device configured in the form of a top-mounted-flap fitting 9 is provided in order to move the top-mounted flap 3 relative to the basic furniture structure 2, about a horizontal pivot axis, from the open position, which is shown in FIG. 1, into a closed position (not shown), in which the flap is in contact with the front side of the basic furniture structure 2, and back. The top-mounted-flap fitting 9 has, on the side wall 4, a first fitting unit 10 and, on the side wall 5, a second fitting unit 11, which are constructed in a similar way, but specifically for functionally correct arrangement on the respective side wall 4 or 5.

Each fitting unit 10 and 11 comprises a basic unit 12, a guide 13 having a pivoting-arm arrangement 14, and also an attachment portion, which is designed, for example, in the form of an installation unit 15. The attachment portion or the installation unit 15 is integrated on a corner-connecting mechanism 22 (see FIGS. 3-6), which will be explained in detail hereinbelow. The basic unit 12 is connected to the installation unit 15 via a plurality of articulated pivoting arms of the pivoting-arm arrangement 14. The installation unit 15 is fastened in a fixed, but releasable, manner on the inner side of the top-mounted flap 3 or the furniture-part frame 16.

The basic unit 12 is preferably formed from a sheet-metal component and comprises a planar, flat and thin baseplate and a flat, thin housing element, which is located opposite the baseplate. The housing element is covered by a covering element 18 or a cover plate.

The basic unit 12 also has, on its end side, an end portion 19, of which the outer side is oriented transversely to the plane of the baseplate. The relevant pivoting arms of the pivoting-arm arrangement 14 engage through a rectangular aperture 20 in the end portion 19. The width of the end portion 19, which is designed in the form of a plug-on component, corresponds to a conventional width a of the side wall 4 of, for example, 16 millimeters. The overall width or thickness of the fitting units 10 and 11 is approximately 12 millimeters, and therefore, accordingly, a respective rectangular-surface-area aperture in the side walls 4 and 5 has a depth of approximately 12 millimeters, which results in a residual base thickness of the side walls 4, 5 in the region of the respective aperture of approximately 4 millimeters.

Figure 2:
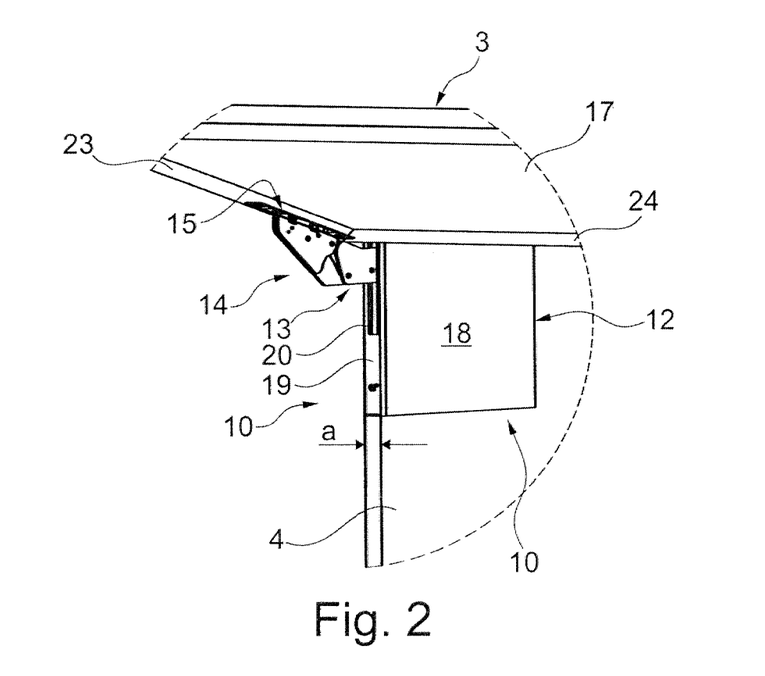
FIG. 2 shows an enlarged illustration of the region A, which is outlined in FIG. 1.
Figure 3:
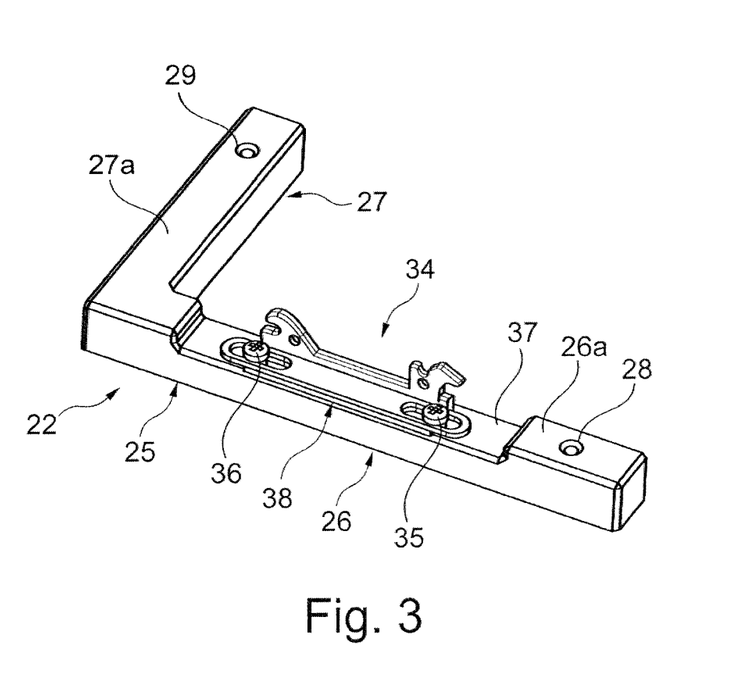
FIG. 3 shows a perspective view, as seen obliquely from above, of an example of a corner-connecting mechanism of the connector according to the present invention.

FIG. 3 is an illustration solely of a corner-connecting mechanism 22 of the connector 21 according to the present invention. Two frame elements 23, 24 (see FIGS. 2, 5 and 6) of the furniture-part frame 16 can be connected by the connector 21. The relevant corner regions of the furniture flap 3 are located at the top, as seen in relation to the closed, use state of the furniture flap 3 on the wall unit 1, or form a right-hand upper corner region and a left-hand upper corner region. The respective fitting unit 10, 11, or the corresponding respective pivoting-arm arrangement 14, acts there in the region of the first lateral frame element 23, or of an opposite, second lateral frame element, of the furniture flap 3, wherein the upper frame element 24 is present between the lateral frame elements.

Figure 5:
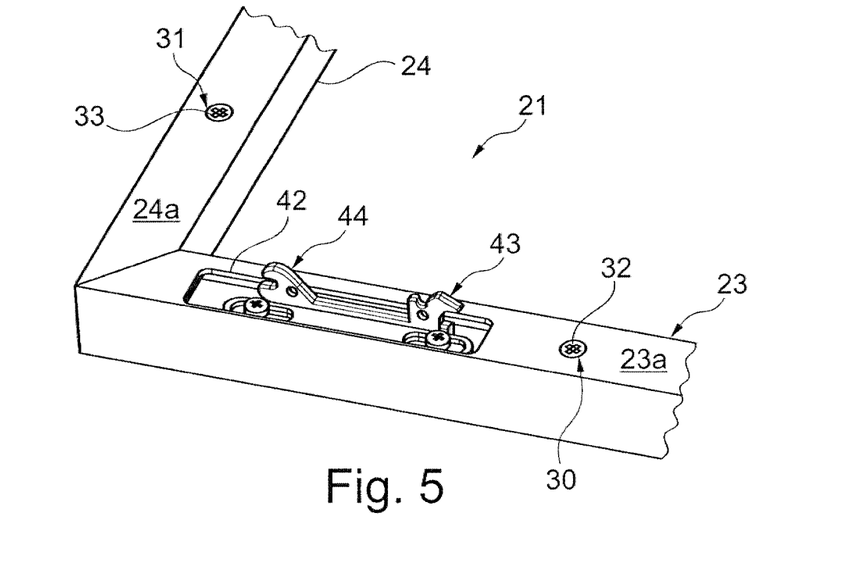
FIG. 5 shows a perspective detail of a corner region of the frame of the furniture part from FIG. 1 with two frame elements, which are connected by the corner-connecting mechanism from FIG. 3.
Figure 6:
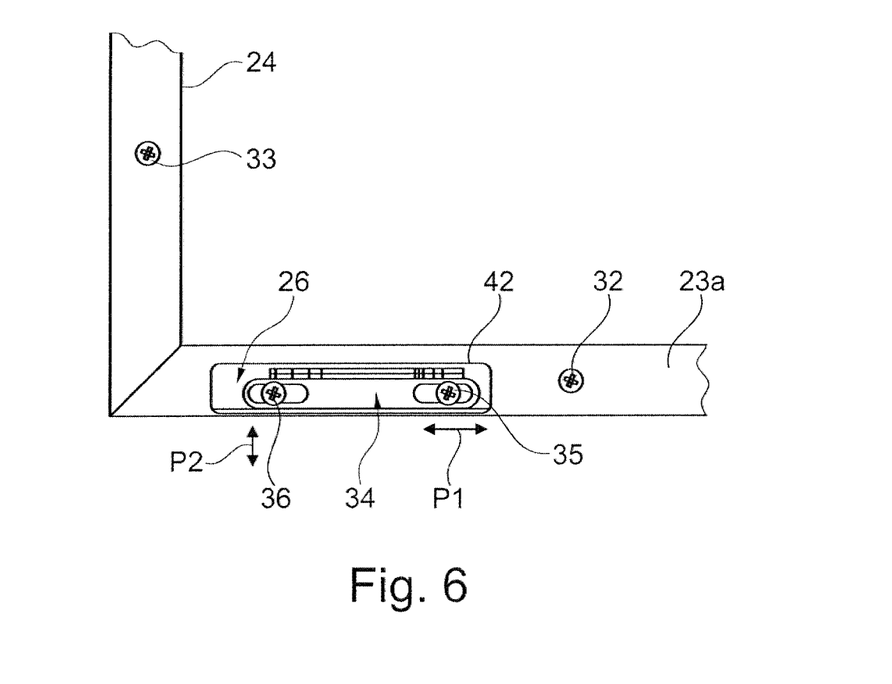
FIG. 6 shows a plan view of the corner region of the furniture-part frame according to FIG. 5.

The two frame elements 23, 24 are cross-sectionally quadrilateral profiles or hollow profiles, for example, hollow aluminum profiles, for example, extruded profiles.

Figure 4:
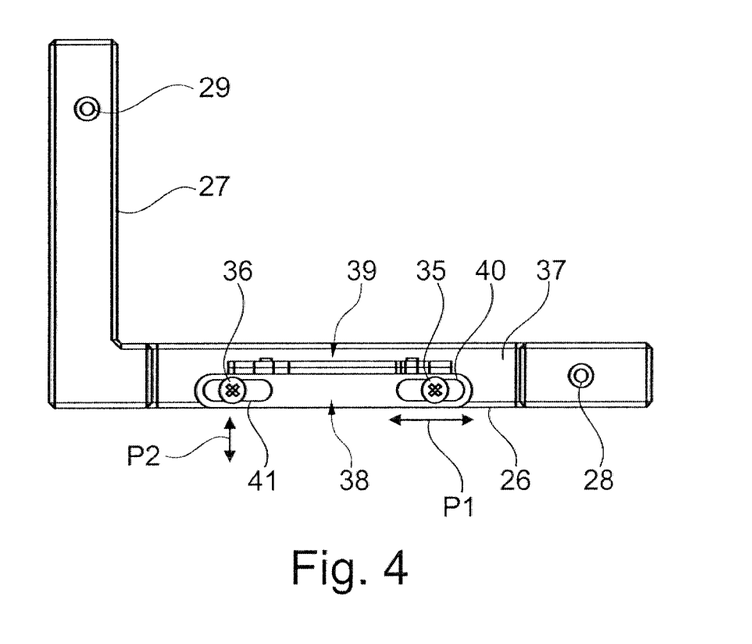
FIG. 4 shows a plan view of the corner-connecting mechanism from FIG. 3.

The corner-connecting mechanism 22 is preferably likewise made of a metal material and has a single-piece main body 25, which is preferably made of a solid material and has two elongate arms 26 and 27 oriented at right angles to one another.

In FIGS. 3-6, an attachment portion 34 is fitted on the corner-connecting mechanism, which will be explained hereinbelow.

The arms 26, 27 are connected to one another to form a single part. The outer contour of the arms 26, 27 is more or less quadrilateral, or in other words rectangular or square, depending on the inner shape or inner contour of the hollow frame elements 23, 24. At least upper longitudinal edges of the arms 26, 27 are rounded or chamfered.

The arm 26, without the attachment portion 34, is smooth and can be pushed or plug-fitted into the end portion of the frame element 23 possibly with a slight amount of frictional resistance. Correspondingly, for the purpose of connecting the frame elements 23, 24, the arm 27 can be plug-fitted into the hollow end portion of the frame element 24.

An inner planar side 26a of the arm 26, as seen in relation to the use state of the top-mounted flap 3, is provided with an internally threaded screw-in opening 28 which, in the case of the arm 26 being properly plug-fitted in the frame element 23, is aligned in its position with an opening 30 on an inner side 23a of the frame element 23, and, therefore, a fastening screw 32 can be screwed in and, in the process, engages through the opening 30 and into the screw-in opening 28, or the internal thread thereof, in order to fix the corner-connecting mechanism 22 to the frame element 23.

Correspondingly, an inner side 27a of the arm 27, as seen in relation to the use state of the top-mounted flap 3, is provided with an internally threaded screw-in opening 29 which, in the case of the arm 27 being properly plug-fitted in the frame element 24, is aligned in its position with an opening 31 on an inner side 24a of the frame element 24, and, therefore, a fastening screw 33 can be screwed in and, in the process, engages through the opening 31 and the screw-in opening 29, or the internal thread thereof, in order to fix the corner-connecting mechanism 22 to the frame element 24.

The respective end regions on the end sides of the two frame elements 23 and 24, it being possible for the end regions to be connected to one another with gap-free abutting contact by way of a mitre joint, are oriented in each case at an angle of 45 degrees to the longitudinal axis of the respective frame elements 23, 24.

In the state in which the two frame elements 23 and 24 are connected to one another by the main body 25 of the corner-connecting mechanism 22, the attachment portion 34 is integrated on the corner-connecting mechanism 22. For this purpose, the attachment portion 34 is screwed on the arm 26 by means of two screws 35 and 36. For the introduction of the attachment portion 34, a window-like cutout 42 is present on the inner side 23a, in the region between the opening 30 and the oblique end region on the end side of the frame element 23.

The inner side 26a of the arm 26 has a lower-level region with a planar base 37. The base 37 is oriented parallel to the adjacent, or remaining, regions of the side 26a and has two screw-connection holes which are offset or spaced apart in the longitudinal direction of the arm 26 and are concealed, and, therefore, cannot be seen, in FIGS. 3-6.

The screws 35 and 36 are provided for fastening the attachment portion 34 and are part of adjuster for adjusting a height position and a lateral position of the attachment portion 34 on the corner-connecting mechanism 22. It is, therefore, possible, when the piece of furniture or wall unit 1 is in the finished state, to adjust the height position and the lateral position of the furniture part or of the top-mounted flap 3 relative to the basic furniture structure 2.

The attachment portion 34 is produced, by way of example, from a bent sheet-metal material and is configured in the form of an elongate angular element with two limbs 38 and 39 located at right angles to one another. The limb 38, which has its underside supported on the base 37, has two through-holes 40, 41 for the screws 35 and 36. The through-holes 40, 41, each designed in the form of a slot, and the screws 35, 36, each configured in the form of eccentric screws, are configured for the purpose of adjusting the height position and the lateral position of the attachment portion 34 on the corner-connecting mechanism 22.

The screw 35 and the through-hole 40 provide for a first eccentric arrangement, which makes it possible, by the screw 35 being turned in the clockwise or counterclockwise direction, to adjust the height position of the attachment portion 34 in the two height directions in accordance with the double arrow P1.

The screw 36 and the through-hole 41 provide for a second eccentric arrangement, which makes it possible, by the screw 36 being turned in the clockwise or counterclockwise direction, to adjust the lateral position of the attachment portion 34 in the two lateral directions in accordance with the double arrow P2.

The limb 39, which is located transversely to the opening of the cutout 42, comprises two contact portions 43 and 44, which project on the same side, or outward, and are configured for latching in a releasable manner to appropriately fitting mating portions (not illustrated) at the furniture-part end of the pivoting-arm arrangement 14. For this purpose, both contact portions 43 and 44 project outward on the side 23a. The two contact portions 43 and 44 each have a latching contour, such as an undercut contour or a hook contour.

On the other side of the furniture-part frame 16, where the pivoting-arm arrangement of the further fitting unit 11 of the top-mounted-flap fitting 9 acts on the top-mounted flap 3, the corner region between the upper frame element 24 and the associated further lateral frame element is provided with a corresponding connector having a corner-connecting mechanism which corresponds to the corner-connecting mechanism 22, and, therefore, contact portions for latching in a releasable manner to the pivoting-arm arrangement are likewise available there.

Figure 7:
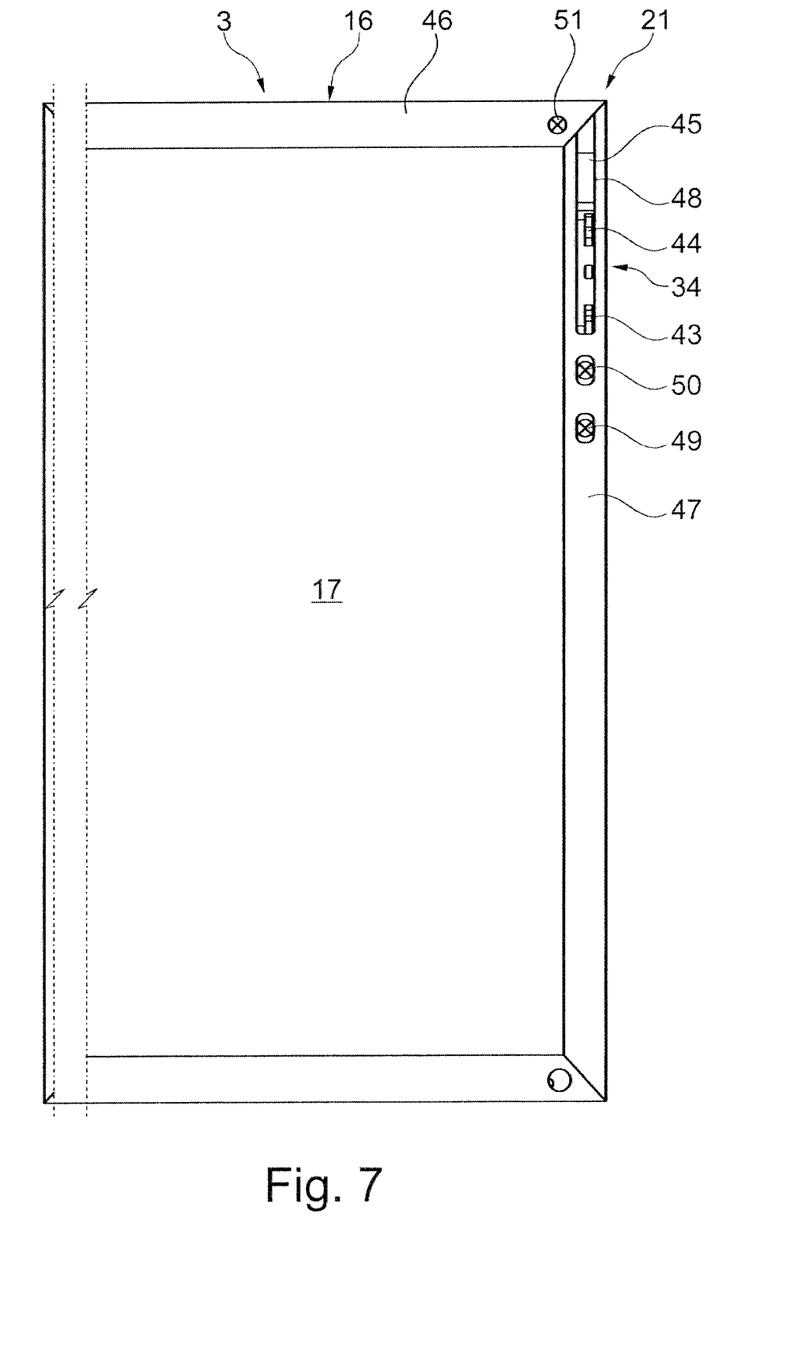
FIG. 7 shows an inner-side view of an alternative furniture part according to the present invention, which is illustrated in cut-away form.

FIG. 7 shows an alternative furniture part according to the present invention or an alternative top-mounted flap 3, which has a furniture-part frame 16 with an inner element 17. In its two upper corner regions, the furniture-part frame 16 has respective connectors 21 according to the present invention having a corner-connecting mechanism 45, which can have its two right-angled arms plug-fitted into an end portion of an upper frame element 46, and into an end portion of a lateral frame element 47, and fixed therein. In a manner corresponding to the corner-connecting mechanism 22, an attachment portion 34 with two contact portions 43 and 44 is formed on the corner-connecting mechanism 45, wherein the contact portions 43 and 44 project through a cutout 48 in the frame element 47. It is also the case that adjusters are provided for adjusting the attachment portion 34 on the corner-connecting mechanism 45, the adjusters comprising a screw 49 for height-position adjustment, a screw 50 for lateral-position adjustment, each of these screws preferably being provided in an eccentric arrangement, and a screw 51 for depth-position adjustment in the direction perpendicular to the image plane.

The cut-away illustration in FIG. 7 means that a corresponding arrangement on the opposite side of the top-mounted flap 3, in the upper corner region on the inside of the top-mounted flap 3, is not visible.

| List of Reference Signs | |
| --- | --- |
| 1 | Wall unit |
| 2 | Basic furniture structure |
| 3 | Top-mounted flap |
| 4 | Side wall |
| 5 | Side wall |
| 6 | Underside |
| 7 | Upper side |
| 8 | Rear wall |
| 9 | Top-mounted-flap fitting |
| 10 | Fitting unit |
| 11 | Fitting unit |
| 12 | Basic unit |
| 13 | Guide |
| 14 | Pivoting-arm arrangement |
| 15 | Installation unit |
| 16 | Furniture-part frame |
| 17 | Inner element |
| 18 | Covering element |
| 19 | End portion |
| 20 | Aperture |
| 21 | Connector |
| 22 | Corner-connecting mechanism |
| 23 | Frame element |
| 23a | Side |
| 24 | Frame element |
| 24a | Side |

-continued

| List of Reference Signs | |
|---|---|
| 25 | Main body |
| 26 | Arm |
| 26a | Side |
| 27 | Arm |
| 27a | Side |
| 28 | Screw-in opening |
| 29 | Screw-in opening |
| 30 | Opening |
| 31 | Opening |
| 32 | Fastening screw |
| 33 | Fastening screw |
| 34 | Attachment portion |
| 35 | Screw |
| 36 | Screw |
| 37 | Base |
| 38 | Limb |
| 39 | Limb |
| 40 | Through-hole |
| 41 | Through-hole |
| 42 | Cutout |
| 43 | Contact portion |
| 44 | Contact portion |
| 45 | Corner-connecting mechanism |
| 46 | Frame element |
| 47 | Frame element |
| 48 | Cutout |
| 49 | Screw |
| 50 | Screw |
| 51 | Screw |

The invention claimed is:

1. A connector, by way of which two frame elements of a frame of a furniture part can be connected, the connector comprising:
a corner-connecting mechanism for connecting respective end portions of the two frame elements in a corner region of the frame;
and
an attachment portion, for attaching the corner-connecting mechanism to a latching portion of a pivoting device, integrated on the corner-connecting mechanism,
wherein the attachment portion comprises two projecting contact portions on the corner-connecting mechanism,
wherein the two projecting contact portions extend in a perpendicular direction with respect to an attachment plane of the attachment portion,
wherein the two projecting contact portions can be releasably latched to the latching portion of the pivoting device, and
wherein the furniture part can be accommodated on a basic structure of a piece of furniture such that it can be pivoted by means of the pivoting device.

2. The connector as claimed in claim 1, wherein the attachment portion is fitted in a releasable manner on the corner-connecting mechanism.

3. The connector as claimed in claim 1, wherein the corner-connecting mechanism comprises a main body, on which the attachment portion is accommodated.

4. The connector as claimed in claim 3, wherein the attachment portion is fitted on a side of the main body that is oriented parallel to an inner side of the frame.

5. The connector as claimed in claim 4, wherein the frame is formed by the frame elements.

6. The connector as claimed in claim 3, wherein the main body comprises a first elongate arm and a second elongate arm, wherein the first elongate arm is oriented at an angle to the second elongate arm.

7. The connector as claimed in claim 1, wherein the corner-connecting mechanism is configured to be accommodated in an inner volume of the two frame elements of the frame.

8. The connector as claimed in claim 1, further comprising an adjuster, for adjusting a height position and/or a lateral position of the attachment portion, present on the corner-connecting mechanism.

9. The connector as claimed in claim 8, wherein the adjuster comprises a screw-connection element, which can be screwed into a main body of the corner-connecting mechanism and which engages through a guide portion in the attachment portion.

10. The connector as claimed in claim 9, wherein the guide portion is a slot.

11. The connector as claimed in claim 8, wherein the attachment portion is designed in the form of an elongate angular element with two limbs located at an angle to one another, wherein a first limb of the angular element has two projecting contact portions, and the adjuster is active on a second limb of the angular element.

12. A furniture part having a frame, which is formed from at least two frame elements and surrounds a surface-area region of the furniture part, wherein the frame elements are connected by a connector as claimed in claim 1.

13. The furniture part as claimed in claim 12, wherein the frame elements have hollow-profile portions, wherein the connection of the frame elements by the connector is established in the region of the hollow-profile portions.

\* \* \* \* \*